United States Patent
Peck et al.

(10) Patent No.: US 7,014,150 B2
(45) Date of Patent: Mar. 21, 2006

(54) METHOD AND SYSTEM FOR OPTIMIZING TORQUE IN A CMG ARRAY

(75) Inventors: Mason A. Peck, Scottsdale, AZ (US); Brian J. Hamilton, Glendale, AZ (US); Brian Underhill, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/903,774

(22) Filed: Jul. 30, 2004

(65) Prior Publication Data

US 2006/0022091 A1 Feb. 2, 2006

(51) Int. Cl.
*B64G 1/28* (2006.01)

(52) U.S. Cl. .............................. 244/165; 701/13; 74/5.4

(58) Field of Classification Search ................ 244/164, 244/165; 701/4, 8, 13; 74/5.4, 5.22, 5.47, 74/5.42, 5.46
See application file for complete search history.

(56) References Cited

U.S. PATENT DOCUMENTS

| | | | | |
|---|---|---|---|---|
| 5,269,483 A | * | 12/1993 | Flament | 244/164 |
| 5,875,676 A | * | 3/1999 | Bailey et al. | 74/5.22 |
| 6,039,290 A | | 3/2000 | Wie et al. | |
| 6,047,927 A | * | 4/2000 | Heiberg et al. | 244/165 |
| 6,128,556 A | * | 10/2000 | Bailey | 701/13 |
| 6,131,056 A | | 10/2000 | Bailey et al. | |
| 6,154,691 A | * | 11/2000 | Bailey | 701/13 |
| 6,354,163 B1 | | 3/2002 | Heiberg | |
| 6,360,996 B1 | | 3/2002 | Bockman et al. | |
| 6,648,274 B1 | * | 11/2003 | Bailey et al. | 244/165 |
| 6,681,649 B1 | * | 1/2004 | Hyde et al. | 74/5.47 |
| 6,917,862 B1 | * | 7/2005 | Wie | 701/13 |

FOREIGN PATENT DOCUMENTS

WO  WO 2004/032392 A  4/2004

OTHER PUBLICATIONS

PCT International Search Report: PCT/US2005/025709, Applicant Reference No. H0007346PCT-5706, Nov. 8, 2005, EP International Search Authority, 6 pages.

* cited by examiner

*Primary Examiner*—Galen Barefoot
(74) *Attorney, Agent, or Firm*—Kurt A. Luther

(57) ABSTRACT

A momentum-control system for a spacecraft is disclosed. The momentum-control system comprises an attitude-control system. The attitude-control system receives data concerning a desired spacecraft maneuver and determines a torque command to complete the desired spacecraft maneuver. A momentum actuator control processor coupled to the attitude-control system receives the torque command. The momentum actuator control processor calculates a gimbal rate command comprising a range-space gimbal rate required to produce the torque command and a null-space gimbal rate required to maximize the ability to provide torque in the direction of a current torque. At least four control-moment gyros are coupled to the momentum control actuator control processor. Each of the control-moment gyros receives and executes the gimbal rate to produce the desired maneuver.

14 Claims, 5 Drawing Sheets

METHOD AND SYSTEM FOR OPTIMIZING TORQUE IN A CMG ARRAY

FIELD OF THE INVENTION

This invention relates to the field of spacecraft vehicle control and, more specifically, to a method and system for optimizing torque in a CMG array.

BACKGROUND OF THE INVENTION

In order to control the attitude of a spacecraft, various rotating inertia members are used. One such inertia member is a control moment gyroscope (CMG). A CMG typically comprises a flywheel with a fixed or variable spin rate mounted to a gimbal assembly. The spin axis of the CMG can be tilted by moving the CMG using the gimbal assembly. This motion produces a gyroscopic torque orthogonal to the spin axis and gimbal axis.

To achieve full attitude control of a spacecraft, a minimum of three CMGs, arranged such that each CMG in the CMG array imparts torque about a linearly independent axis, is typically used. The CMGs are moved about their gimbal axis in response to a command for torque from the spacecraft attitude-control system. Expressed mathematically, a Jacobian A maps the CMG gimbal rates into a three dimensional array torque:

$$A\omega = \tau$$

where A is a 3×n Jacobian matrix, $\omega$ is a n×1 array of gimbal rates for the n gimbals, and $\tau$ is a 3×1 array of torque components to be imparted to the spacecraft. From the above equation and with a known torque command, $\tau$, the individual gimbal rates for each CMG can be calculated. Using the known Moore-Penrose pseudoinverse to invert the Jacobian matrix, a set of possible gimbal rates is:

$$\omega = A^T(AA^T)^{-1}\tau$$

For a given array of CMGs, various alignments of the individual CMGs in the array will produce a given momentum. The collection of momentum for all possible alignments of the CMGs in a CMG array is the momentum envelope. The boundaries of the momentum envelope represent the maximum achievable momentum for a particular alignment of CMGs. In one embodiment, when there are three CMGs, each point in the momentum envelope can be achieved, in general, by a unique combination of gimbal angles. When the number of CMGs exceeds the minimum number of CMGs required for full attitude control, then most points in the momentum envelope can be defined by more than one alignment of the CMGs in the CMG array.

Conversely, in response to a command to produce a requested torque, the CMGs can be in one of several alignments; each alignment produces the requested torque but at a different point on the momentum envelope. It therefore follows that for an array of CMGs having more than three CMGs, there is an alignment of the CMGs that will result in a requested torque and maximize the potential to deliver momentum.

Inherent in the use of CMGs is the possibility that the CMGs' momentum vectors may line up in such a way that one or more components of the requested torque cannot be provided. Mathematically this situation occurs when the eigenvalues of $AA^T$ approach zero, causing $(AA^T)^{-1}$ to go to infinity. Equivalently, singularities occur when the determinant of the matrix $AA^T$ is equal to zero (expressed algebraically as $\det(AA^T)=0$). In the case of a 3×n matrix A, this is equivalent to saying the rank of the matrix $AA^T$ is two or less.

Different approaches have been devised to avoid singularities in the movement of CMGs. In one approach, to ensure that $(AA^T)^{-1}$ never is 0, $(AA^T)^{-1}$ is replaced by $(AA^T+\epsilon I)^{-1}$ where I is the identity matrix and $\epsilon$ is a small number. The use of a positive $\epsilon$ ensures that $\det(AA^T+\epsilon I)^{-1}$ never becomes 0.

While useful in some instances, a drawback to this approach is that this approach changes the gimbal rate calculation. An analogous problem is the scalar expression $$\frac{1}{a^2+\varepsilon}. \text{ As } a \to 0, \frac{1}{a^2+\varepsilon} \to \frac{1}{\varepsilon},$$

which is well-behaved but not equal to $$\frac{1}{a^2}.$$

In the case of the Jacobian A, the pseudoinverse no longer exactly maps gimbal rates into the commanded torques because of the error $\epsilon$ introduces. This resulting error steers the spacecraft in the wrong direction and can introduce significant, undesired torque, especially near the singularity.

A further drawback of the $(AA^T+\epsilon I)^{-1}$ approach is that it does very little until the CMGs are already very near the singularity, where gimbal-rate capability (and therefore CMG array torque capability) can be undesirably low. What is needed is a method and system for maximizing available torque during CMG movements. In addition, it is further desirable to provide a momentum-control system with the maximum torque available when CMGs are manipulated. This optimization allows the momentum-control system to provide momentum for a large period of time or larger amounts of momentum for a short period of time. While the present invention does not address the inability of a singular array to apply torque perpendicular to the current torque command, the present invention maximizes capability in the currently commanded direction, which is of greater value. That is, the present invention addresses singularity avoidance only for the direction of the currently commanded torque. However, nothing precludes the use of the present invention described herein at the same time as one of many other singularity-avoidance approaches. The commands from the teachings of the present invention and the commands from a singularity-avoidance method can assigned various weights and combined in a way chosen as the best compromise between performance in one dimension (the present invention) and singularity avoidance in three dimensions.

BRIEF SUMMARY OF THE INVENTION

In one embodiment of the present invention, a method for maximizing momentum in the direction of the current torque of a CMG array is disclosed. The method includes receiving a torque command representing a desired torque to produce an attitude adjustment for a spacecraft. Next, a range-space gimbal rate required to produce the desired torque and a null-space gimbal rate required to maximize the ability to provide torque in a direction of the current torque are calculated. The total gimbal rate is calculated by summing the range-space gimbal rate and the null-space gimbal rate. Then, commands are provided to the CMGs to produce the total gimbal rate.

In another embodiment of the present invention, a momentum-control system for a spacecraft is disclosed. The momentum-control system comprises an attitude-control system. The attitude-control system receives data concerning a desired spacecraft maneuver and determines a torque command to complete the desired spacecraft maneuver. A momentum actuator control processor coupled to the attitude-control system receives the torque command. The momentum actuator control processor calculates a gimbal-rate command comprising a range-space gimbal rate required to produce the torque command and a null-space gimbal rate required to maximize the ability to provide torque in the direction of a current torque command. At least four control-moment gyros are coupled to the momentum control actuator control processor. Each of the control-moment gyros receive and execute the gimbal rate to produce the desired output.

BRIEF DESCRIPTION OF DRAWINGS

The present invention will hereinafter be described in conjunction with the following drawing figures, wherein like numerals denote like elements, and.

DETAILED DESCRIPTION OF THE INVENTION

Figure 1:
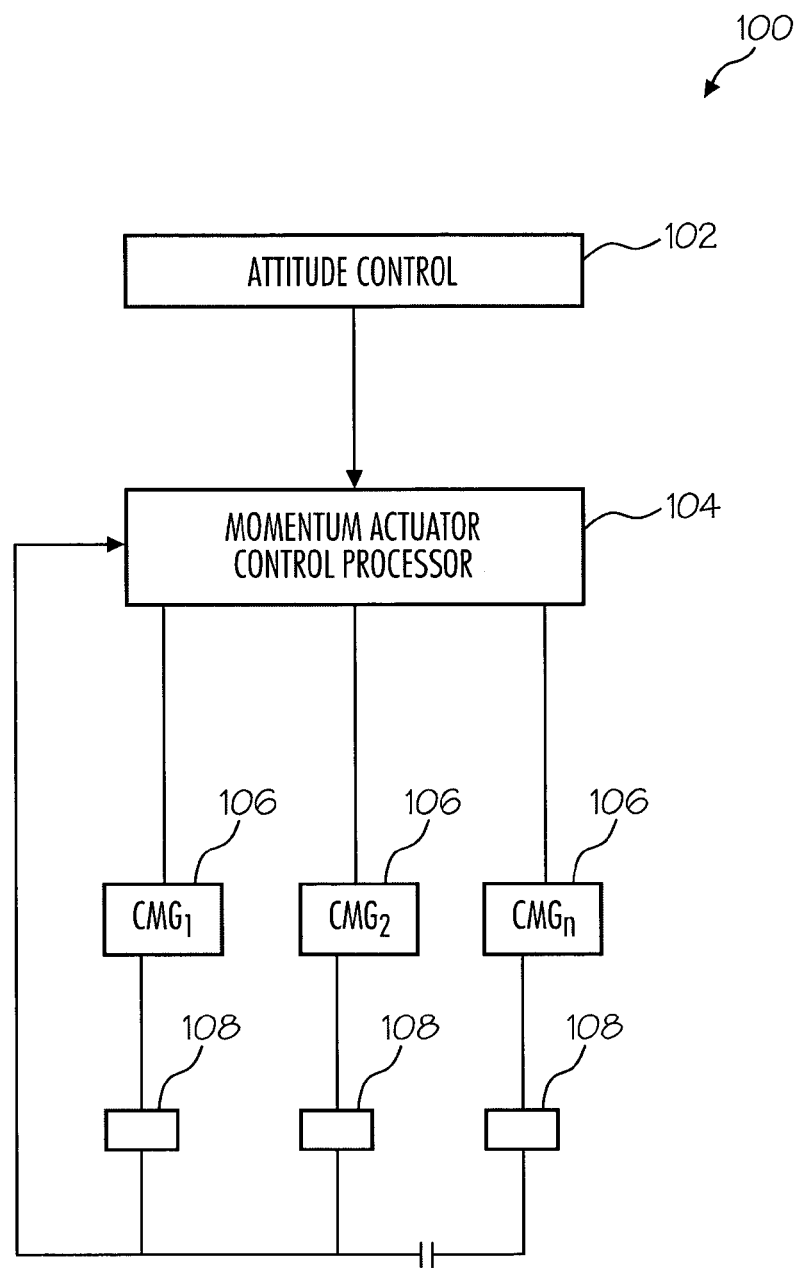
FIG. 1 is a block diagram illustrating an exemplary CMG control system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following detailed description describes the use of the present invention in terms of its use in an exemplary CMG array singularity avoidance system. However, applications of the present invention are not limited to any one specific application or embodiment, but are useful in many different areas of endeavor.

The present invention takes advantage of null-space steering when moving the CMGs in a CMG array to provide torque. Furthermore, the present invention does so in a way that optimally conditions the CMG array at all times, achieving gimbal angles that optimize the array's ability to deliver torque in a chosen direction. As discussed previously, a minimum of three CMGs is required to provide the three degrees of freedom needed to orient a spacecraft. However, in many cases more than three CMGs are implemented. The extra CMGs are typically provided for mechanical redundancy purposes but are occasionally used in the implementation of sophisticated steering laws like the present invention. Each extra CMG provides an extra mathematical degree of freedom. As discussed previously, in a three-dimensional vector space, the CMGs' gimbal rates can be mapped into a three-dimensional torque array by use of the Jacobian A:

$$A\omega = \tau \qquad (1)$$

where, in this three-CMG example, A is a 3×3 matrix, $\omega$ is a 3×1 matrix, and $\tau$ is a 3×1 matrix. If extra CMGs are provided and n is the number of CMGs in the CMG array, then A will be a 3×n matrix, $\omega$ an n×1 matrix and $\tau$ a 3×1 matrix. For a CMG array comprising n CMGs, with n>3, the subspace of the n-dimensional vector space associated with the nonzero singular values of A is known as the range space. When rank(A)=3, the range space of A is the three-dimensional physical space, which is inhabited by the three-dimensional, physical torque.

The rest of the n-dimensional vector space is known as the null space. The null space is outside and perpendicular to the range space. Together, both the range space and the null space completely span the n-dimensional vector space. Values of $\omega$ that lie entirely within the null space of A produce no physical torque. A 3×n matrix A provides for a three-dimensional range space and a null space of dimension at least n−3.

When changing the attitude of a spacecraft, only the movement of CMGs in the range space affects the attitude of the spacecraft. Conversely, motions of the CMG gimbals in the null space produce no physical torque and, thus, no error in the torque provided by the CMGs. A matrix B can be defined as spanning the null space of matrix A. One way to compute B is:

$$B = I - A^T(AA^T)^{-1}A \qquad (2)$$

where I is the identity matrix.

While movement of the CMGs in the null space does not affect the torque provided by the CMG array, the movement of the CMGs in the null space can affect how each CMG gimbal angle contributes to the total gimbal rate, $\omega$, an n×1 array, required to produce the torque:

$$\omega = \omega_r + \omega_n \qquad (3)$$

where $\omega_r$ is the portion of the total gimbal-rate vector that lies within the range space, and $\omega_n$ is the portion within the null space.

An exemplary control system 100 for implementing the present invention is illustrated in FIG. 1. The components of the control system 100 are known in the art and can be assembled in different ways using different processors, software, controllers, sensors and the like. The control system 100 includes an attitude-control system 102 coupled to a momentum actuator control processor 104. CMGs 106 are coupled the momentum actuator control processor 104. Associated with each CMG 106 are one or more CMG sensors 108 for providing information concerning the state of the CMG 106 to the control system 100. Control system 100, in one embodiment, is mounted on a spacecraft such as an orbiting satellite.

Attitude-control system 102 controls the positioning of a spacecraft. The attitude-control system 102 receives data concerning a desired spacecraft maneuver and determines an appropriate torque command to complete the desired maneuver. The torque commands are presented to the momentum actuator control processor 104. The momentum actuator control processor 104, in response to the torque commands, calculates the gimbal rates necessary to produce the commanded torque. Additionally, the momentum actuator control processor 104 calculates CMG movement in both the range space and the null space to optimally condition the array for providing torque in a certain direction.

The momentum actuator control processor 104, based on the above-identified calculations, provides the necessary commands to the CMGs 106 such that the CMG movement produces the commanded torque and, in accordance with the teachings of the present invention, provides the torque while optimally conditioning the array for torque in a certain direction. In one embodiment, there are at least four CMGs: three mathematical degrees of freedom to provide motion in the range space (the desired torque) and at least one additional degree of freedom to allow null-space motion to steer towards a torque-optional configuration. Individual CMGs are not necessarily devoted exclusively to range-space or null-space motion; rather, all of the CMGs, working in concert, produce both range-space and null-space effects.

Since movement of the CMGs in the null space can change how the output torque is achieved, movement in the null space can be used to optimally condition the array for torque in a certain direction. For example, in one embodiment of the present invention, each CMG in the CMG array is moved such that the ability to provide torque in the direction of the present torque is maximized. The reason for this choice of direction is that most spacecraft maneuvers are undertaken with acceleration, coasting and deceleration close to a (one-dimensional) line in three-dimensional momentum space. Therefore, maximizing the ability of the array to provide torque along such a line maximizes the array's capability in a nearly global sense. In order to maximize the ability to provide torque in the direction of the current torque, each individual CMG is moved such that the momentum vector for that CMG is as close to perpendicular to the direction of the current torque command. Again, this motion occurs in the null space so that it does not interfere with the torque the array is commanded to apply. A method for optimizing torque in a CMG array is illustrated with reference to FIGS. 2 and 3.

Figure 2:
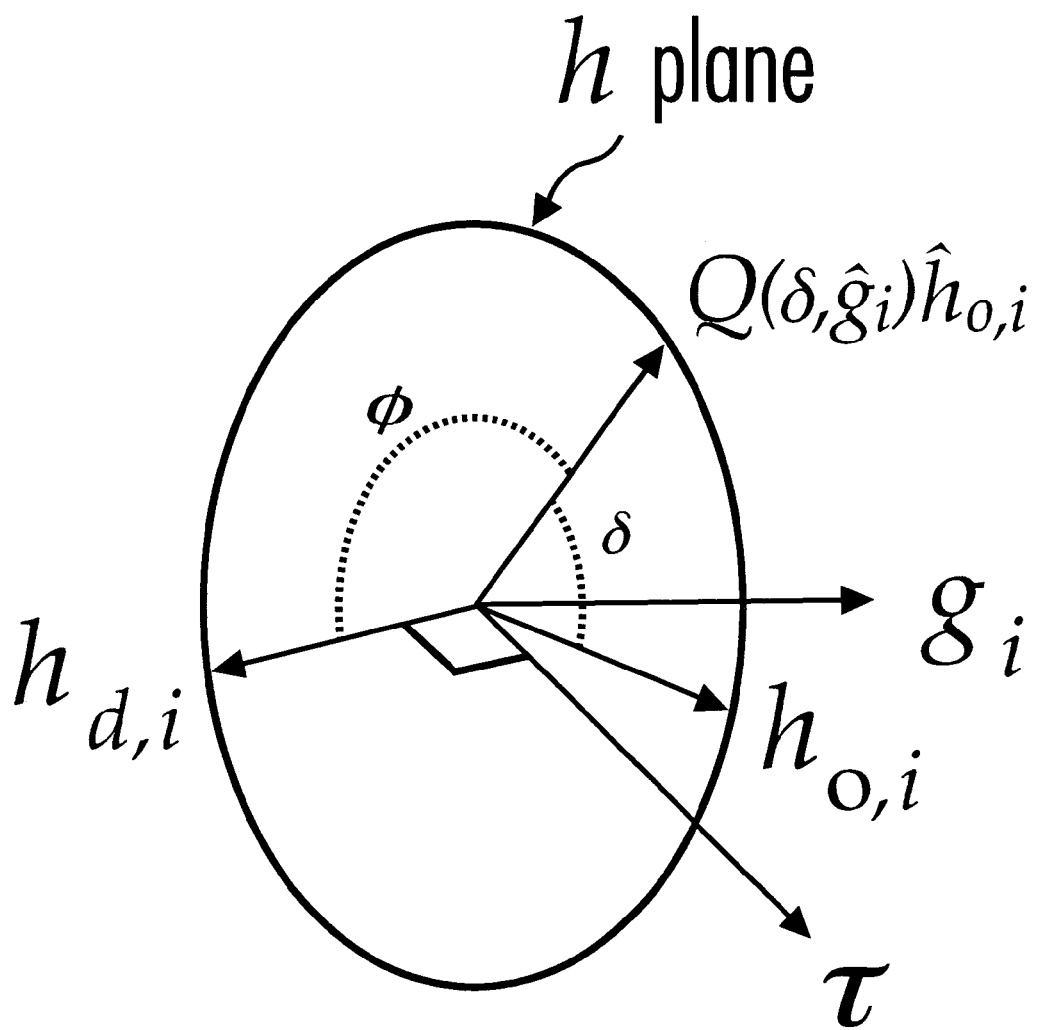
FIG. 2 is an illustration of a momentum plane of a CMG.

FIG. 2 illustrates the momentum plane for an exemplary CMG. The momentum for this CMG is confined to the momentum plane. A gimbal axis, $g_i$, and a command torque, $\tau$, are shown in FIG. 2. The commanded torque is the total requested torque and this is provided by the vector sum of the torque from each CMG. The gimbal axis is fixed for each CMG but can, and typically will, vary among CMGs. The momentum vector for the $i^{th}$ CMG for zero gimbal angle is $\hbar_{o,i}$. This momentum vector rotated by the gimbal angle, $\delta$, is $\hbar_i = Q(\delta, \hat{g}_i) \hbar_{o,i}$, where $Q(\delta, \hat{g})$ is a direction-cosine matrix for rotation by an angle $\delta$ about an axis. $\hbar_{d,i}$ is the desired momentum vector that will give the $i^{th}$ CMG the maximum torque output in the direction of the current torque. $\hbar_{d,i}$ is calculated to be as close to perpendicular to the command torque as possible. When this occurs, $\hbar_i$ is, as always, perpendicular to the gimbal axis, $g_i$, and the cross product of $\hbar_{d,i}$ and $g_i$ will have its maximum possible projection along the $\tau$ direction. Therefore, the torque capability is maximized along the direction of the commanded torque.

Figure 3:
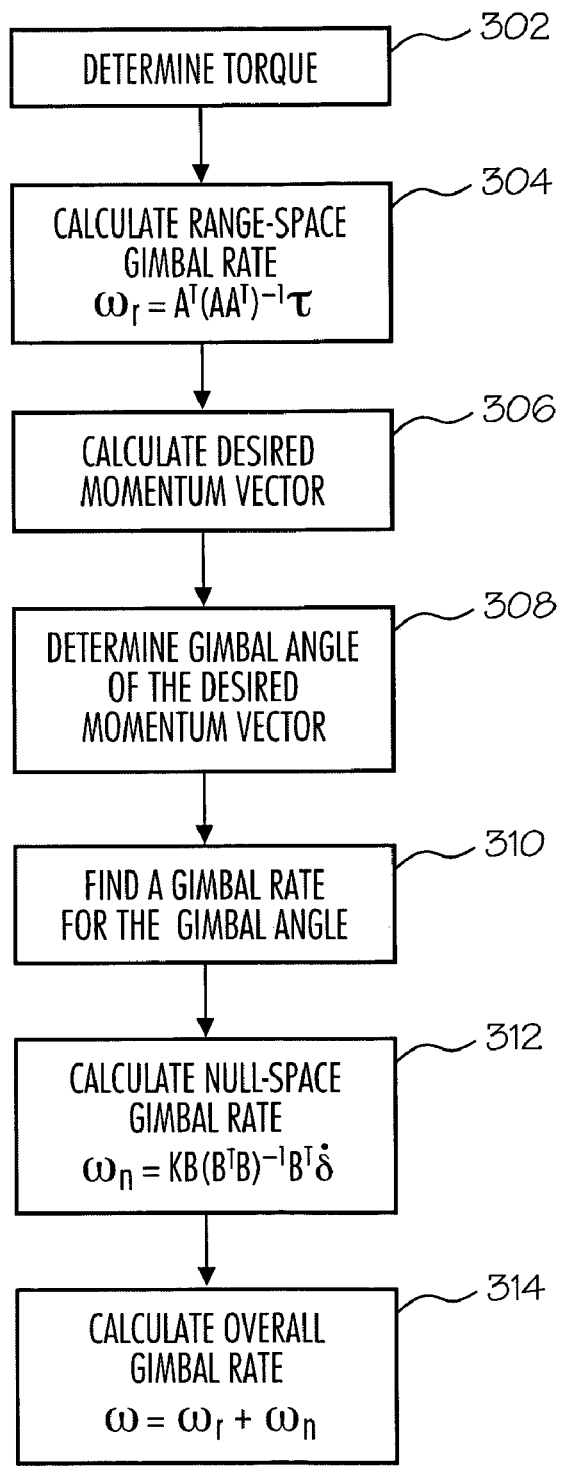
FIG. 3 is a flowchart illustrating a torque maximization CMG steering law.

A method for determining the gimbal angle to make $\hbar_{d,i}$ perpendicular to the command torque for each CMG and to determine the null-space gimbal rate to achieve the determined gimbal angle is illustrated in the flowchart of FIG. 3. In a first step, step 302, the command torque to perform a desired attitude adjustment is determined.

Next, in step 304, the range-space gimbal rate needed to the required command torque, $\tau$ is determined:

$$\omega_r = A^T(AA^T)^{-1}\tau \quad (4)$$

This calculation can be done by noting that the Jacobian A can be represented by:

$$A=[v_1\ v_2\ \ldots\ v_n] \quad (5)$$

In addition, the symmetric $AA^T$ matrix can be written as $$AA^T = \begin{bmatrix} \sum_{i=1}^{n} v_{ix}^2 & \sum_{i=1}^{n} v_{ix}v_{iy} & \sum_{i=1}^{n} v_{ix}v_{iz} \\ & \sum_{i=1}^{n} v_{iy}^2 & \sum_{i=1}^{n} v_{iy}v_{iz} \\ (sym) & & \sum_{i=1}^{n} v_{iz}^2 \end{bmatrix} \quad (6)$$

where $$v_i = g_i^x \hat{h}_i = g_i^x Q(\delta, \hat{g}_i) \hat{h}_{0,i} \quad (7)$$

Once the range-space gimbal rate is determined, the null space gimbal rate is determined. In step 306, the desired momentum vector, $\hbar_{d,i}$ is determined:

$$\hat{h}_{d,i} = \frac{\tau \times g_i}{\|\tau \times g_i\|} \quad (8)$$

Where $\tau$ is the command torque and $g_i$ is the gimbal axis of the $i^{th}$ CMG. Note that since the momentum vector $\hbar_{d,i}$ results from the cross product of the command torque $\tau$ and gimbal axis $g_i$, the desired momentum vector, $\hbar_{d,i}$ is perpendicular to the command torque $\tau$ and gimbal axis $g_i$.

Once the momentum vector $\hbar_{d,i}$ that is perpendicular to the command torque $\tau$ and gimbal axis $g_i$ is determined, the gimbal angle of that momentum vector is calculated in step 308:

$$\cos\phi_i = -Q(\delta_i, \hat{g}_i)^T \hbar_{d,i} sgn(((Q(\delta_i, \hat{g}_i) \hbar_{d,i}) \times \hbar_{d,i})^T \hat{g}_i) \quad (9)$$

where $\phi_i$ is the change in gimbal angle required to rotate the momentum vector from its current position to the desired position that is perpendicular to the command torque. The sgn function returns the sign (positive or negative) of its argument. The sign determines whether the momentum vector must rotate clockwise or counterclockwise to achieve the desired orientation.

The gimbal angle $\phi_i$ is then used to determine a gimbal rate, $\dot{\delta}$, in step 310:

$$\dot{\delta} = K(\phi_i) \quad (10)$$

Where K is a gain, chosen based on several criteria known to practitioners of the art of control-system design. For example, in one embodiment K to creates a stable closed-loop system in the presence of CMG dynamics, existing rate-control loops and other factors. Roughly speaking, feeding back position error to a rate actuation ought to result in an unconditionally stable system, provided other effects such as sampling lag and system dynamics are negligible.

The gimbal rate $\dot{\delta}$ is then projected on to the null space to determine the null-space gimbal rate in step 312.

$$\omega_n = B(B^TB)^{-1}B^T\dot{\delta} \quad (11)$$

where $B(B^TB)^{-1}B^T$ projects the gimbal rate on to the null space.

Then, in step 314, the overall gimbal rate is calculated:

$$\omega = \omega_r + \omega_n \quad (12)$$

Thus, ω is the gimbal rate required both to provide the required torque and to maximize torque capability.

While the present invention does not address the inability of a singular array to apply torque perpendicular to the current torque command, it maximizes capability of delivery torque in the currently commanded direction, which is of greater value. That is, the present invention addresses singularity avoidance only for the direction of the currently commanded torque. However, nothing precludes utilizing the teachings of the present invention in conjunction with one of many singularity-avoidance approaches. For example, in one embodiment, the commands from the teachings of the present invention and the commands from a singularity-avoidance method can assigned various weights and combined in a way chosen as the best compromise between performance in one dimension (the present invention) and singularity avoidance in three dimensions. For example, the teachings of the present invention can be used in conjunction with the a singularity-avoidance method that maximizes the determinant of $(AA^T)$ using null-space steering, as described in conjunction with FIG. 4, or the teachings of the present invention can be used in conjunction with a singularity-avoidance method that maximizes the eigenvalues of $(AA^T)$ using null-space steering, as described in conjunction with FIG. 5. These are, of course, just two examples of singularity-avoidance methods that can be used in conjunction with the teachings of the present invention.

Figure 4:
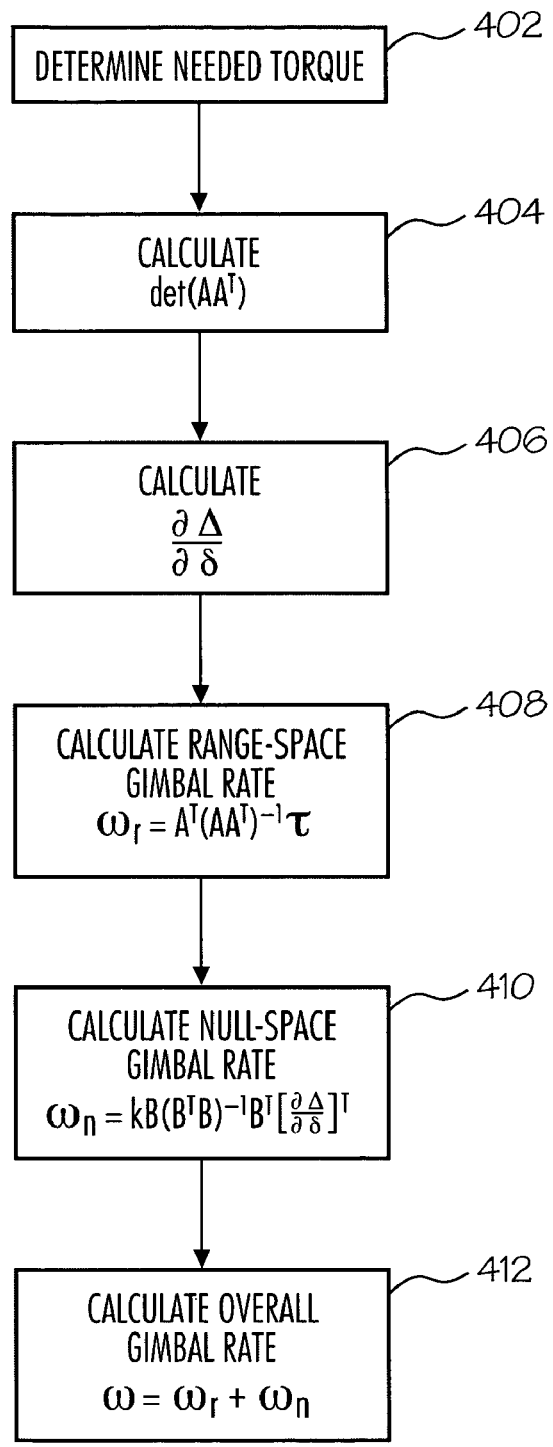
FIG. 4 is a flowchart illustrating a determinant-maximizing CMG steering law.

FIG. 4 is a flowchart illustrating a method for maximizing the determinant of $(AA^T)$ using null-space steering. In a first step, step 402, the torque required to move the spacecraft is determined, in one embodiment by the attitude-control system 102. Next, in step 404, the elements of the $AA^T$ matrix are calculated to determine the determinant. The result is an entirely analytical gradient-steering method, whose explicit solution for the gimbal motion eliminates the need for numerical search algorithms. For example, given (for a n-CMG system) a Jacobian A whose columns are represented by:

$$A = [v_1 \; v_2 \; \ldots \; v_n] \quad (13)$$

the determinant of the symmetric matrix $AA^T$ depends on the six terms found in:

$$AA^T = \begin{bmatrix} \sum_{i=1}^{n} v_{ix}^2 & \sum_{i=1}^{n} v_{ix}v_{iy} & \sum_{i=1}^{n} v_{ix}v_{iz} \\ & \sum_{i=1}^{n} v_{iy}^2 & \sum_{i=1}^{n} v_{iy}v_{iz} \\ (sym) & & \sum_{i=1}^{n} v_{iz}^2 \end{bmatrix} \quad (14)$$

These six values can be computed from the known elements of A using:

$$S_{jk} = \sum_{i=1}^{n} v_{ij}v_{ik} \quad (15)$$

In terms of these precomputed values, the determinant of $(AA^T)$ can be expressed as:

$$det(AA^T) = \Delta = S_{xx}S_{yy}S_{zz} + 2S_{xy}S_{xz}S_{yz} - S_{xx}S_{yz}^2 - S_{yy}S_{xz}^2 - S_{zz}S_{xy}^2 \quad (16)$$

In a next step, step 406, the change in the determinant, Δ, with respect to the change in output torque direction, δ, can be calculated:

$$\frac{\partial \Delta}{\partial \delta} = \begin{bmatrix} \frac{\partial \Delta}{\partial \delta_1} & \frac{\partial \Delta}{\partial \delta_2} & \cdots & \frac{\partial \Delta}{\partial \delta_n} \end{bmatrix}. \quad (17)$$

To calculate $$\frac{\partial \Delta}{\partial \delta},$$

the chain rule can be used. From the chain rule:

$$\frac{\partial \Delta}{\partial \delta_i} = \frac{\partial \Delta}{\partial v_i} \frac{\partial v_i}{\partial \delta_i}. \quad (18)$$

Given that the elements of the Jacobian A can be expressed as:

$$v_i = g_i^x \hbar_i = g_i^x e^{(\delta_i g_i^x)} \hbar_{0,i} \quad (19)$$

where $g_i$ is the $i^{th}$ CMG's gimbal axis rate and $h_i$ is the $i^{th}$ CMG's angular momentum. The derivative of $v_i$ with respect to the $i^{th}$ gimbal angle can thus be calculated:

$$\frac{\partial v_i}{\partial \delta_i} = g_i^x g_i^x e^{(\delta_i g_i^x)} \hbar_{0,i} \quad (20)$$

The matrix exponential $e^{\delta_i g_i^x}$ is used as a convenience in the derivation. In practice, this direction-cosine matrix is a simple function of the gimbal axis and sines and cosines of the gimbal angle. The matrix exponential $e^{\delta_i g_i^x}$ represents a rotation of an angle δ about an axis $g_i$.

The derivative of the determinant with respect to $v_i$ can be found in its x, y and z components as:

$$\frac{\partial \Delta}{\partial v_{i,x}} = 2v_{i,x}S_{yy}S_{zz} + S_{yz}(v_{i,y}S_{xz} + v_{i,x}S_{xy}) - \quad (21)$$

$$2v_{i,x}S_{yz}^2 - 2v_{i,z}S_{yy}S_{xz} - 2v_{i,y}S_{zz}S_{xy}$$

$$\frac{\partial \Delta}{\partial v_{i,y}} = 2v_{i,y}S_{xx}S_{zz} + 2S_{xz}(v_{i,z}S_{xy} + v_{i,y}S_{yz}) -$$

$$2v_{i,z}S_{xx} - 2v_{i,y}S_{xz}^2 - 2v_{i,x}S_{zz}S_{xy}$$

$$\frac{\partial \Delta}{\partial v_{i,z}} = 2v_{i,y}S_{xx}S_{yy} + 2S_{xy}(v_{i,x}S_{xz} + v_{i,y}S_{yz}) -$$

$$2v_{i,y}S_{xx}S_{yz} - 2v_{i,x}S_{xz}S_{yy} - 2v_{i,z}S_{zz}^2$$

Eqn. 21 can be precomputed using Eqn. 15. Then, the change in determinant with respect to the output torque direction, $$\frac{\partial \Delta}{\partial \delta},$$

can be determined from Eqns. 20 and 21 using the chain rule as shown in Eqn. 18. The result is an analytical expression for incremental change in the determinant with respect to incremental change in the output torque direction.

Next, in step 408, the range-space gimbal rate can be calculated using:

$$\omega_r = A^T(AA^T)^{-1}\tau \quad (22)$$

Then, in step 410, the null-space gimbal rate can be calculated from:

$$\omega_n = KB(B^TB)^{-1}B^T\left[\frac{\partial \Delta}{\partial \delta}\right]^T \quad (23)$$

K is a matrix or scalar gain, either constant or otherwise, selected to ensure that the gimbal rate never exceeds a maximum value and so that, for all points in the CMG array's capability, the determinant, $\det(AA^T)$, is driven away from singularities faster than it is drawn to them.

$B(B^TB)^{-1}B^T$ projects the gimbal motion that would follow the gradient of the determinant exactly onto the null space so that it does not influence the output torque. In the present embodiment, since A has a rank of three and because null-space steering ensures the invertibility of $AA^T$, closed-form solutions for the pseudoinverse of A and for the null space of A (i.e. B) are possible:

$$B = I - A^T(AA^T)^{-1}A \quad (24)$$

where I is a 3×3 identity matrix.

$$\frac{\partial \Delta}{\partial \delta}$$

is the partial derivative of the determinant with respect to the output torque direction. The components of this vector were previously calculated in step 406. The expression $$\left[\frac{\partial \Delta}{\partial \delta}\right]^T$$

is used as the pseudoinverse of $$\frac{\partial \Delta}{\partial \delta}.$$

The traditional pseudoinverse includes a factor of one over the square of the magnitude. Since, in this case, the magnitude can never go to zero in the gimbal angle set, this term can be excluded. The result is a bell-behaved, stable, null-space command.

Next, in step 412, the total n×1 gimbal rate command, $\omega$, can be determined as the sum of the range-space gimbal rate and the null-space gimbal rate:

$$\omega = \omega_r + \omega_n \quad (25)$$

This is the commanded gimbal rate for each CMG in the CMG array.

In a second embodiment, the null-space steering maximizes a weighted sum of the eigenvalues of $(AA^T)$. For an n×n matrix, D, a scalar, $\lambda$, is an eigenvalue of D if there is a non-zero vector x such that $Dx = \lambda x$. The eigenvalue can be found by first rewriting $Dx = \lambda x$ as $[D - \lambda_o I]x = 0$. This equation has a non-trivial solution if and only if $\det(D - \lambda_o I) = 0$. Also, it is known that the $$\det(D) = \det D = \prod_{i=1}^{n} \lambda_i.$$

That is, the product of the eigenvalues equals the determinant of the matrix. Therefore, indirectly, this embodiment also steers the CMGs in a way that attempts to optimize the determinant. The difference in this embodiment is that each of the eigenvalues can be treated individually, an approach that may offer more versatility in some applications.

Figure 5:
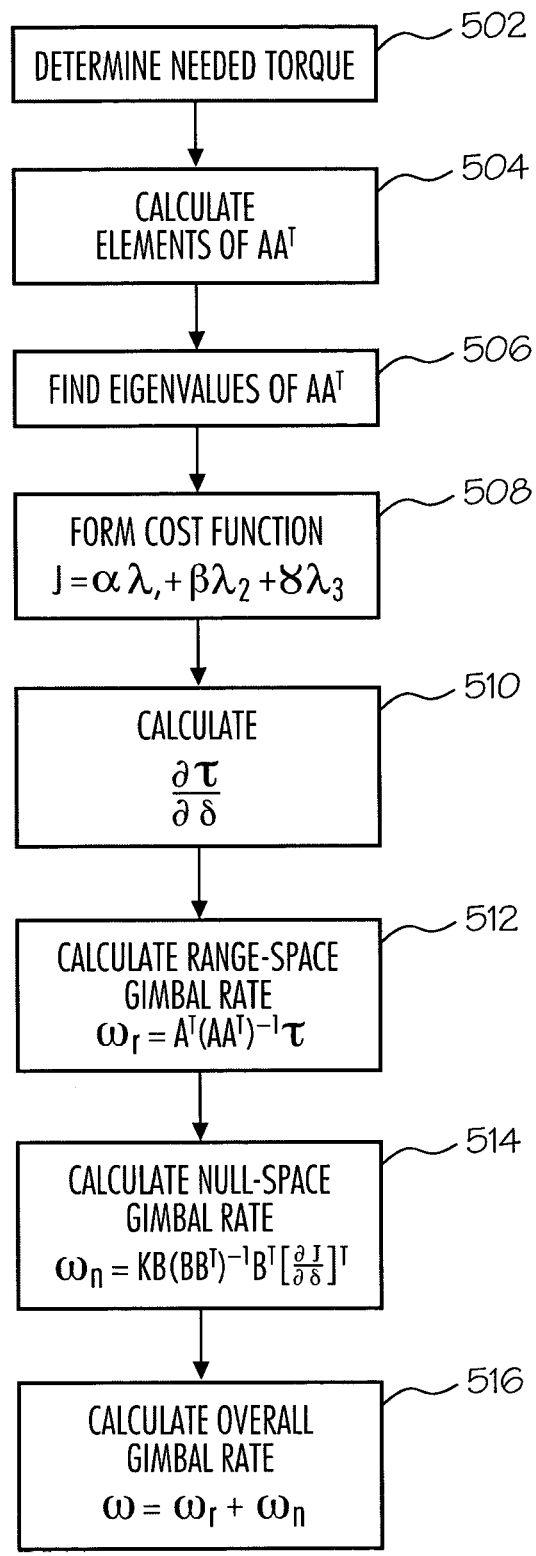
FIG. 5 is a flowchart illustrating an eigenvalue-based steering law.

As discussed previously, when $\det(AA^T) = 0$ the CMG array is singular. Since the product of the eigenvalues of a matrix equals the determinant of the matrix, by maximizing the weighted sum of the eigenvalues, singularities can be avoided. FIG. 5 is a flowchart illustrating an embodiment of the present invention that maximizes the eigenvalues of $(AA^T)$ by null-space motion.

In a first step, the required torque is determined (step 502). This torque is the torque requested to change the attitude of the spacecraft. Next, in step 504, the elements of the matrix $AA^T$ are calculated. The elements of matrix $AA^T$ are calculated in the same manner as the first embodiment.

Next, in step 506, the eigenvalues of $AA^T$ are calculated. As discussed previously the eigenvalues of $AA^T$ can be found from solving $\det(AA^T - \lambda I) = 0$ for the $\lambda$. Since $AA^T$ has a rank of three, there will be three eigenvalues: $\lambda_1$, $\lambda_2$, and $\lambda_3$, and the solution to $\det(AA^T - \lambda I) = 0$ will be a third-degree polynomial, for which a closed-form, analytical solution can be found. Furthermore, these eigenvalues will all be real and nonzero, further simplifying the computation.

In step 508, a weighted sum of the eigenvalues can be formed as a cost function, J, to be maximized:

$$J = \alpha \lambda_1 + \beta \lambda_2 + \gamma \lambda_3 \quad (26)$$

In Eqn. 26, the coefficients $\alpha$, $\beta$ and $\gamma$ are weighting factors that can be varied to emphasis a particular eigenvalue if desired. Alternatively, the coefficients can be given equal weight.

In step 510, the derivative of the cost function with respect to the gimbal angle can be calculated using the chain rule:

$$\frac{\partial J}{\partial \delta_i} = \frac{\partial J}{\partial v_i}\frac{\partial v}{\partial \delta_i} \text{ where, as before,} \quad (27)$$

$$\frac{\partial v_i}{\partial \delta_i} = g_i^x g_i^x e^{(\delta_i g_i^x)} \hat{h}_{0,i} \quad (28)$$

Moreover, for this embodiment:

$$\frac{\partial J}{\partial v_i} = \frac{\partial J}{\partial \lambda_i} \frac{\partial \lambda_i}{\partial v_i} \quad (29)$$

Both $$\frac{\partial v_i}{\partial \delta_i} \text{ and } \frac{\partial J}{\partial v_i}$$

can be computed analytically from the eigenvalues determined previously. After $$\frac{\partial J}{\partial \delta_i}$$

is calculated, in step 512, the range-space gimbal rate can be calculated as before:

$$\omega_r = A^T(AA^T)^{-1}\tau \quad (30)$$

Then, in step 514, the null-space gimbal rate can be calculated:

$$\omega_n = KB(B^TB)^{-1}B^T \left[\frac{\partial J}{\partial \delta}\right]^T \quad (31)$$

where K is the gain as discussed previously, $B(B^TB)^{-1}B^T$ projects the gradient of the cost function on to the null space and $$\frac{\partial J}{\partial \delta}$$

is the partial derivative of the cost function with respect to gimbal angle. In step 516, the total gimbal rate is calculated as the sum of the range-space gimbal rate, $\omega_r$, and the null-space gimbal rate, $\omega_n$:

$$\omega = \omega_r + \omega_n \quad (32)$$

This sum gives the gimbal rate that both produces the desired torque without an error and ensures that the torque is produced without encountering a singularity of a CMG. This is the commanded gimbal rate for each CMG in the CMG array needed for the avoidance of singularities. The gimbal rate command that maximizes momentum in the direction of current torque can be combined with the gimbal rate needed to maximize the eigenvalues of $(AA^T)$ to provide an optimal combined gimbal rate that minimizes the possibility of encountering a singularity in three dimensions while maximizing momentum in the direction of the current torque.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed:

1. A method for optimizing torque in a CMG array of a spacecraft comprising:
   receiving a torque command representing a desired torque to produce an attitude adjustment for the spacecraft;
   computing a range-space gimbal rate required to produce the desired torque;
   computing a null-space gimbal rate required to maximize the ability to provide torque in a chosen direction;
   computing a total gimbal rate by summing the range-space gimbal rate and the null-space gimbal rate; and
   providing commands to the CMGs to produce the total gimbal rate.

2. The method of claim 1 wherein the step of computing a null-space gimbal rate further comprises computing a null-space gimbal rate based on the projection of a gimbal rate that produces a momentum vector perpendicular to the current direction of the torque onto the null space of the array Jacobian.

3. The method of claim 1 further comprising:
   computing a gimbal rate that avoids singularities in three dimensions; and
   determining an optimal combination of the gimbal rate required to maximize momentum in the direction of current torque and the gimbal rate that avoids singularities in three dimensions.

4. The method of claim 3 wherein the step of computing a gimbal rate that avoids singularities in three dimensions further comprises computing a null-space gimbal rate based on the projection of the determinant of the product of a Jacobian matrix and the transpose of the Jacobian matrix.

5. The method of claim 3 wherein the step of computing a gimbal rate that avoids singularities in three dimensions further comprises computing a null-space gimbal rate based on the projection of the eigenvalues of the product of a Jacobian matrix and the transpose of the Jacobian matrix.

6. A momentum-control system for a spacecraft comprising:
   an attitude-control system operable to receive data concerning a desired spacecraft maneuver and determine a torque command to complete the desired spacecraft maneuver;
   a momentum actuator control processor coupled to the attitude-control system and operable to receive the torque command and calculate a gimbal rate command comprising a range-space gimbal rate required to produce the torque command and a null-space gimbal rate required to maximize the ability to provide torque in a chosen direction; and
   a CMG array comprising at least four control-moment gyros, each CMG operable to receive the gimbal rate command and execute the gimbal rate command to produce the desired maneuver.

7. The momentum-control system of claim 6 wherein the null-space gimbal rate is calculated based on the projection of a gimbal rate that produces a momentum vector perpendicular to the current direction of the torque onto the null space of the array Jacobian.

8. The momentum-control system of claim 6 wherein the momentum actuator control processor is further operable to:
compute a gimbal rate that avoids singularities in three dimensions; and
determine an optimal combination of the gimbal rate command required to maximize momentum in the direction of current torque and the gimbal rate that avoids singularities in three dimensions.

9. The momentum-control system of claim 8 wherein the gimbal rate that avoids singularities in three dimensions is determined by computing a null-space gimbal rate based on the projection of the determinant of the product of a Jacobian matrix and the transpose of the Jacobian matrix.

10. The momentum-control system of claim 8 wherein the gimbal rate that avoids singularities in three dimensions is determined by computing a null-space gimbal rate based on the projection of the eigenvalues of the product of a Jacobian matrix and the transpose of the Jacobian matrix.

11. A method for maximizing the ability to provide torque in a chosen direction of a CMG array in a spacecraft while avoid singularities when maneuvering the spacecraft comprising:
computing by summing a first range-space gimbal rate required to produce a torque to an overall gimbal rate achieve a desired maneuver of the spacecraft and a first null-space gimbal rate required to maximize the ability to provide torque in a given direction;
computing a singularity avoiding gimbal rate by summing a second range-space gimbal rate required to produce a torque to achieve a desired maneuver of the spacecraft and a second null-space gimbal rate required to assist in the avoidance of singularities; and
determining an overall gimbal rate from an optimized combination of the momentum maximizing gimbal rate and the singularity avoiding gimbal rate.

12. The method of claim 11 wherein computing an overall gimbal rate further comprises computing a null-space gimbal rate based on the projection of a gimbal rate that produces a momentum vector perpendicular to the current direction of the torque onto the null space of an array Jacobian.

13. The method of claim 11 wherein computing a second null-space gimbal rate further comprises computing a null-space gimbal rate based on the projection of the determinant of the product of a Jacobian matrix and the transpose of an array Jacobian.

14. The method of claim 11 wherein computing a second null-space gimbal rate further comprises computing a null-space gimbal rate based on the projection of the eigenvalues of the product of a Jacobian matrix and the transpose of an array Jacobian.

* * * * *